UNITED STATES PATENT OFFICE.

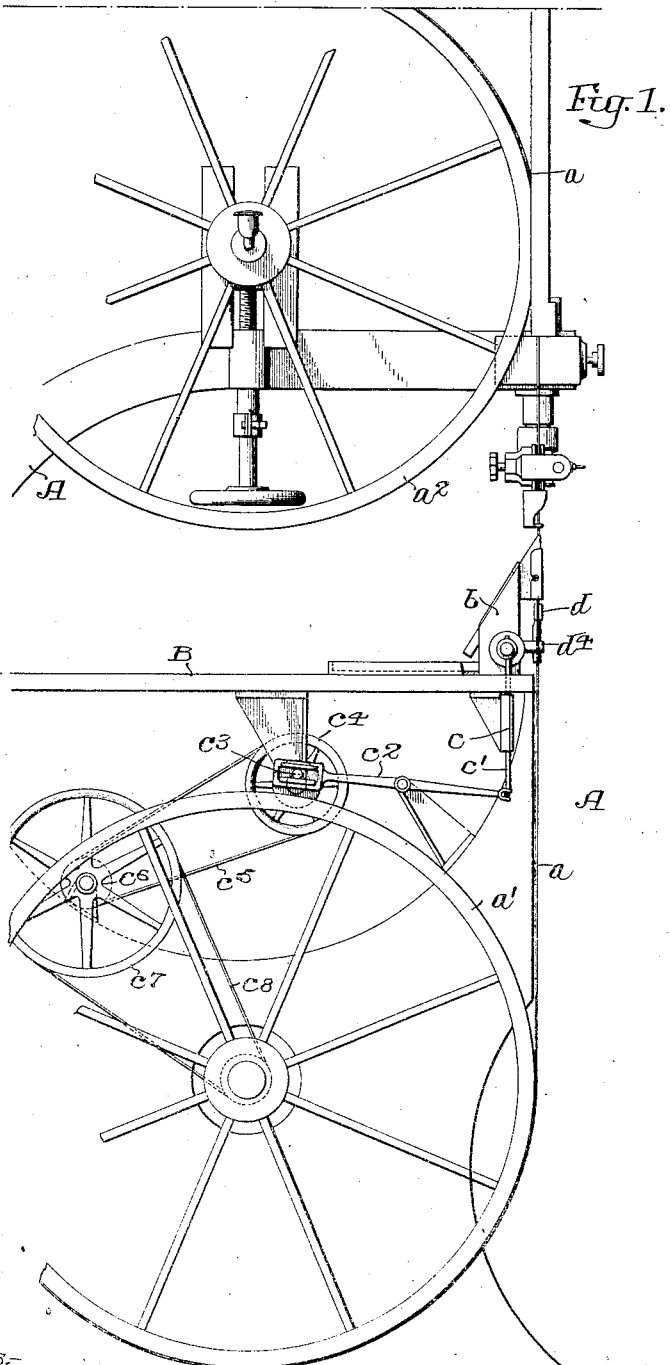

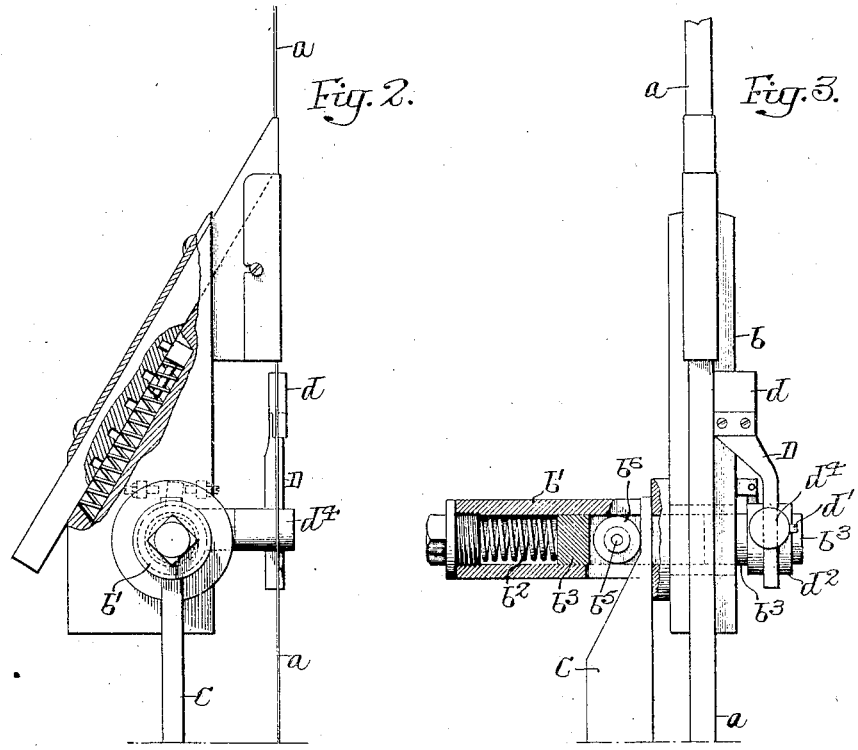

WILLIAM BOTTOMLEY KEIGHLEY, OF VINELAND, NEW JERSEY.

WELT-BEVELING MACHINE.

959,223.

Specification of Letters Patent.  Patented May 24, 1910.

Application filed June 30, 1909. Serial No. 505,210.

*To all whom it may concern:*

Be it known that I, WILLIAM B. KEIGHLEY, a citizen of the United States, residing in Vineland, New Jersey, have invented certain Improvements in Welt-Beveling Machines, of which the following is a specification.

One object of my invention is to provide a relatively simple device whereby the ends of a welt may be quickly and efficiently beveled, the device being particularly designed for use in connection with a band knife for trimming shoes, such as that shown in Patent No. 928,133, dated July 13, 1909.

Another object of my invention is to provide a machine with a welt beveling attachment which shall automatically and rapidly act to properly cut a piece of material when this has been inserted in the necessary position; it being especially desired that this machine shall operate in connection with or include a band knife whereby the cutting is accomplished.

I further desire to provide a continuously running band knife with a reciprocating feeding finger whereby the ends of a welt may be conveniently and uniformly beveled.

These objects and other advantageous ends I secure as hereinafter set forth, reference being had to the accompanying drawings, in which:—

Figure 1, is a side elevation showing my invention as used in connection with a band knife machine for trimming shoes; Fig. 2, is an enlarged side elevation of the work supporting post and knife of the machine shown in Fig. 1, further illustrating my invention; Fig. 3, is a front elevation, partly in section, of the device shown in Fig. 2; Fig. 4, is a plan view; and, Fig. 5, is a perspective view of the feeding finger forming part of my invention.

In Fig. 1 of the above drawings, A is the main supporting frame of the machine which is provided with an endless knife mounted upon two wheels or pulleys $a'$, $a^2$, carried on spindles running in suitable bearings in said frame. Power is applied to one of these wheels from any desired source and in any suitable manner, and the machine is provided with a table B on which is carried a work supporting post $b$, preferably of the construction described and claimed in the patent above mentioned. This post carries a horizontally extending tube $b'$ in which is placed a slide $b^3$ acted upon by a spring $b^2$. Said slide is free to reciprocate within the tube and is longitudinally slotted, for the reception of a roller $b^6$ mounted on a spindle $b^5$. Said roller is placed to be acted upon by a reciprocatory cam C on a rod $c'$, which is guided in a bracket $c$ depending from the under side of the table B. The reciprocating motion is imparted to the rod $c'$ by any suitable mechanism;— in the present case consisting of a lever $c^2$ connected at one end to said rod and at the other slotted to receive a pin $c^3$ eccentrically placed upon a pulley $c^4$. This pulley is driven, through an endless belt $c^5$, two pulleys $c^6$ and $c^7$, and an endless belt $c^8$, from the shaft upon which is carried the band knife supporting wheel $a'$.

The slide $b^3$ carries at its outer end an offset, upwardly extending post D, to the top of which is removably attached a finger or feed plate $d$, shown in detail in Fig. 5. This may be diminished in thickness from one side to the other and has one face roughened or toothed so as to suitably grip and hold the end of a welt. The supporting post D is so set that the roughened surface of the feed plate $d$ lies in a plane at an acute angle to the knife $a$, it being preferable that the connection between the post and slide be capable of adjustment for varying the position of said plate. For this purpose I provide a collar $d^2$ adjustably held on the end of the slide by a set screw $d^3$ and on this collar I mount a block $d^4$ upon which the post D is adjustably held by means of a set screw $d'$. Said block is free to turn on an axis extending at right angles to the line of the slide $b^3$ and is held in any adjusted position by a set screw $d^5$.

Under operating conditions the revolution of the wheels $a'$ and $a^2$ causes the rod $c'$ to be vertically reciprocated, and the cam C on the end of this rod, acting in conjunction with the spring $b^2$, upon the slide $b^3$, causes this latter to be also reciprocated. As a consequence, the feed plate $d$ is moved toward and past the knife $a$, which is at the same time in rapid motion, so that the end of a welt placed between the knife and said plate when the latter is in the position shown in Fig. 3, is fed forward by said plate into engagement with the knife. As the end of the welt lies in engagement with and parallel to the roughened face of the feed plate, it is then cut by the knife on a bevel or incline of greater or less length, depending upon the adjustment of said plate. It is evident that this adjustment can be varied within wide limits by proper setting of the various parts, for by loosening the set screws $d'$, $d^3$ and $d^5$, it may be moved in any one of three planes, so as to render the machine available for use on work of widely different sizes and styles.

While I have shown my invention as employed in connection with a band knife primarily intended for trimming off the surplus material from shoes during their manufacture, it is to be understood that it may be used independently of such a machine without material change.

I claim:—

1. The combination of an endless cutter having a straight operating run; means for driving the cutter; a feeding plate; an arm supporting the plate in a plane at an acute angle to the plane of the operating run of said cutter; and means for automatically actuating said arm to cause the plate to be reciprocated adjacent the cutter.

2. The combination of an endless band cutter, means for driving the same, a feeding plate, and means for automatically moving said plate toward and from said band cutter, one face of the plate being inclined at an angle to the plane of the cutter.

3. The combination with an endless band cutter of means for driving the same; a slide; an arm projecting therefrom; a feeding plate carried on the slide and projecting therefrom toward the knife; and means for moving the slide to reciprocate said plate immediately adjacent said cutter.

4. The combination of a cutter, a feeding plate adjustable to vary its angle to the cutter extending adjacent to the same, a slide supporting said plate, and a cam operative on the slide to cause reciprocation of the same.

5. The combination of a cutter, a slide having a feeding plate adjustable on an axis parallel to the line of the cutter extending adjacent to the same, a cam operative on the slide to cause reciprocation of the same, and a spring acting in opposition to said cam.

6. The combination of a cutter, a slide mounted adjacent thereto, means for reciprocating said slide in a line transverse to the line of the cutter, and a feeding member mounted on the slide so that its face is inclined at an angle to the plane of the cutter.

7. The combination of a cutter, a slide, means for reciprocating said slide, and a feeding plate mounted on said slide so as to be moved thereby toward and from the cutter, said plate being adjustable as to its position relative to the cutter.

8. The combination with a cutter of a feeding plate, and means for moving said plate toward and from said cutter, said plate being adjustable as to its angle to the plane of the cutter.

9. The combination of a cutter, a slide, means for reciprocating said slide, and a feed plate mounted on said slide so as to be moved thereby toward and from the cutter, said plate being adjustable as to its height, distance from the cutter, and angle to the cutter.

10. The combination with a cutter of a slide, a feeding plate mounted on the slide so as to extend at an acute angle to the cutter, a roller carried by the slide, and a reciprocatory cam placed to operate on said roller.

In testimony whereof, I have signed my name to this specification, in the presence of two subscribing witnesses.

WILLIAM BOTTOMLEY KEIGHLEY.

Witnesses:
W. MALCOLM BULLIVANT,
HORTON N. CHAMBERLAIN.